(12) United States Patent
Chen et al.

(10) Patent No.: US 7,532,465 B2
(45) Date of Patent: May 12, 2009

(54) COMPUTER ENCLOSURE WITH DRIVE BRACKET

(75) Inventors: Yun-Lung Chen, Shenzhen (CN); Jun Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 458 days.

(21) Appl. No.: 11/306,538

(22) Filed: Dec. 31, 2005

(65) Prior Publication Data

US 2007/0153469 A1     Jul. 5, 2007

(51) Int. Cl.
*H05K 1/16* (2006.01)
(52) U.S. Cl. .................................................... 361/685
(58) Field of Classification Search ................ 361/685
See application file for complete search history.

(56) References Cited

U.S. PATENT DOCUMENTS

| | | | |
|---|---|---|---|
| 5,745,342 A * | 4/1998 | Jeffries et al. ............... | 361/683 |
| 6,215,664 B1 * | 4/2001 | Hernandez et al. .......... | 361/725 |
| 6,507,487 B1 * | 1/2003 | Barina et al. ................ | 361/685 |
| 6,882,527 B2 | 4/2005 | Wang et al. | |
| 7,254,018 B2 * | 8/2007 | Zhang et al. ................ | 361/685 |
| 7,257,827 B2 * | 8/2007 | Lee ............................ | 720/653 |
| 2004/0075979 A1 * | 4/2004 | Wang et al. ................. | 361/685 |

\* cited by examiner

*Primary Examiner*—Anatoly Vortman
*Assistant Examiner*—Quinn Hunter
(74) *Attorney, Agent, or Firm*—Wei Te Chung

(57) ABSTRACT

A computer enclosure includes a chassis (10), a drive bracket (20) pivotably attached to the chassis, a holder (40) mounted in the chassis, and a positioning member (30) attached to the drive bracket. The holder includes a first clamp (45) with a first groove (451) defined therein. The positioning member includes a first positioning piece (33) corresponding to the first clamp. When the drive bracket is pivoted on the chassis, the first positioning piece is interferentially intruded in the first groove of the first clamp to adjustably position the drive bracket.

6 Claims, 5 Drawing Sheets

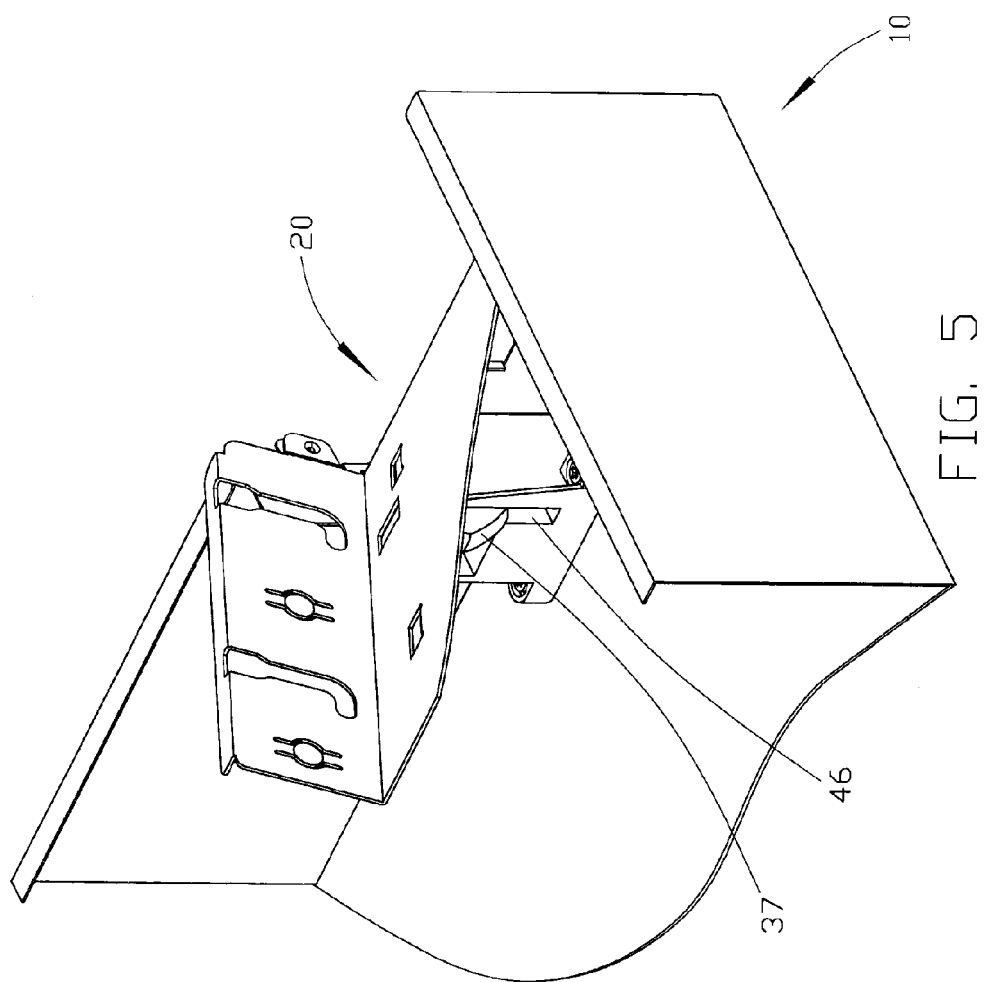

COMPUTER ENCLOSURE WITH DRIVE BRACKET

FIELD OF THE INVENTION

The present invention relates to a computer enclosure, and more particularly to a computer enclosure with an adjustable drive bracket pivotably connected to the computer enclosure.

DESCRIPTION OF RELATED ART

Various data storage devices, such as hard disk drives, floppy disk drives, and optical drives are installed in drive brackets. Usually a typical drive bracket is directly secured in a computer enclosure with a plurality of screws. However, space in the computer enclosure is limited particularly for some mini personal computers. It is hard to remove these date storage devices when they need to be replaced or repaired.

Therefore, pivotable drive brackets have been developed. A typical computer enclosure includes a drive bracket, a cage, a holder attached to a side panel of the cage, and a slider secured to a lower bottom plate of the drive bracket. The holder defines an arcuate groove and a guideway therein. The slider comprises a first shaft and a second shaft. The drive bracket is pivotably installed in the cage. The drive bracket rotates relative to the cage, with the first shaft sliding and being tightly held within the groove, and the second shaft sliding and tightly pressing on the guide way. However the drive brackets can only be positioned in a limited number of positions.

What is needed, therefore, is a computer enclosure with a drive bracket which is able to pivotably installed and locatable in much more positions during rotation thereof.

SUMMARY OF INVENTION

A computer enclosure includes a chassis, a drive bracket pivotably attached to the chassis, a holder mounted in the chassis, and a positioning member attached to the drive bracket. The holder includes a first clamp with a first groove defined therein. The positioning member includes a first positioning piece corresponding to the first clamp. When the drive bracket is pivoted on the chassis, the first positioning piece is interferentially intruded in the first groove of the first clamp to adjustably position the drive bracket.

Other advantages and novel features will be drawn from the following detailed description of a preferred embodiment with attached drawings, in which:

BRIEF DESCRIPTION OF DRAWINGS

FIG. 5 is an assembled view of FIG. 1, showing the drive bracket rotated to an inclined positioned.

DETAILED DESCRIPTION

Figure 1:
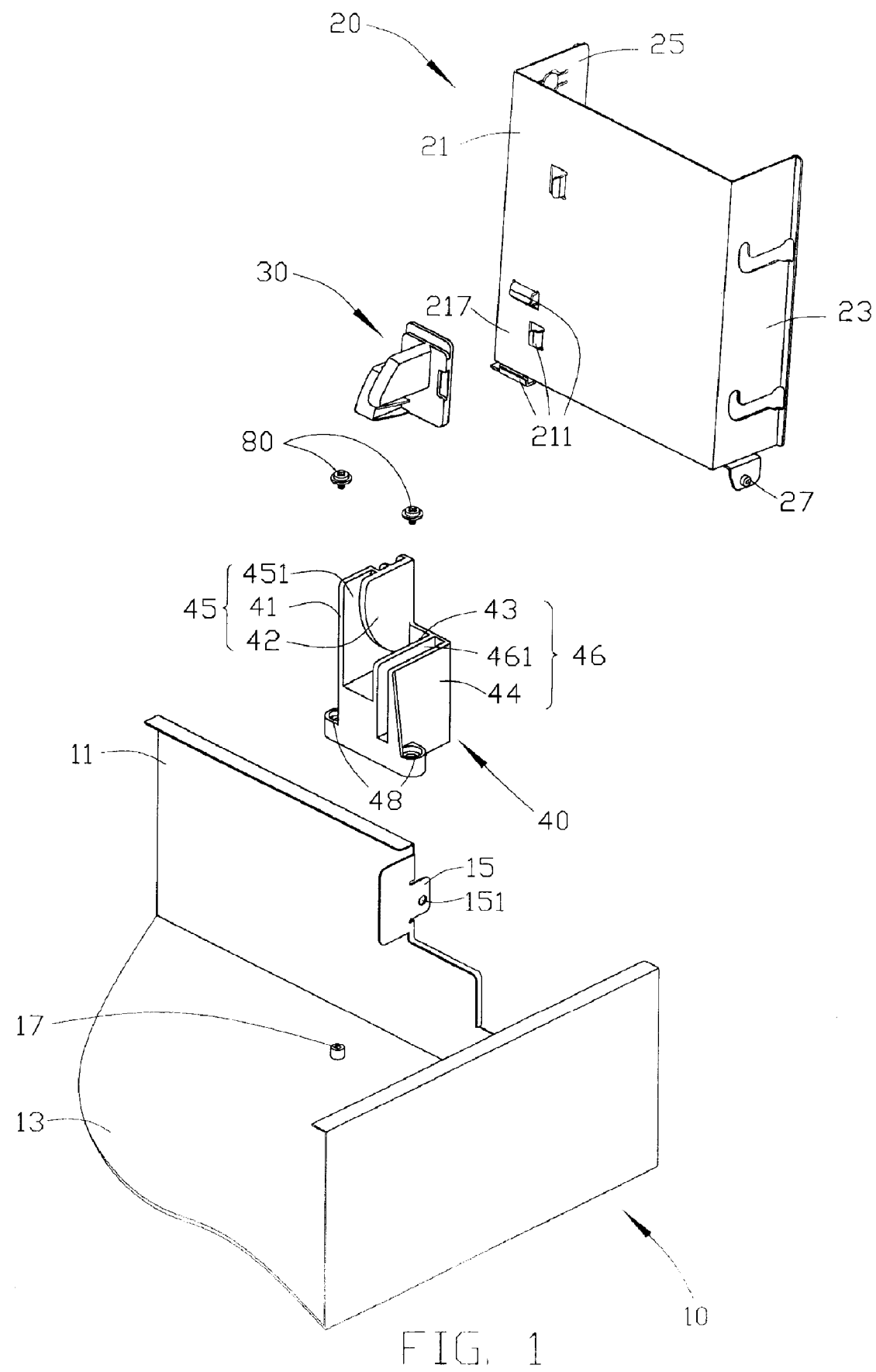
FIG. 1 is an exploded, partial, isometric view of a computer enclosure in accordance with a preferred embodiment of the present invention, including a chassis, a drive bracket, a holder, and a positioning member.

Referring to FIG. 1, a computer enclosure with a drive bracket in accordance with a preferred embodiment of the present invention includes a chassis 10, a drive bracket 20, a positioning member 30, and a holder 40.

Figure 2:
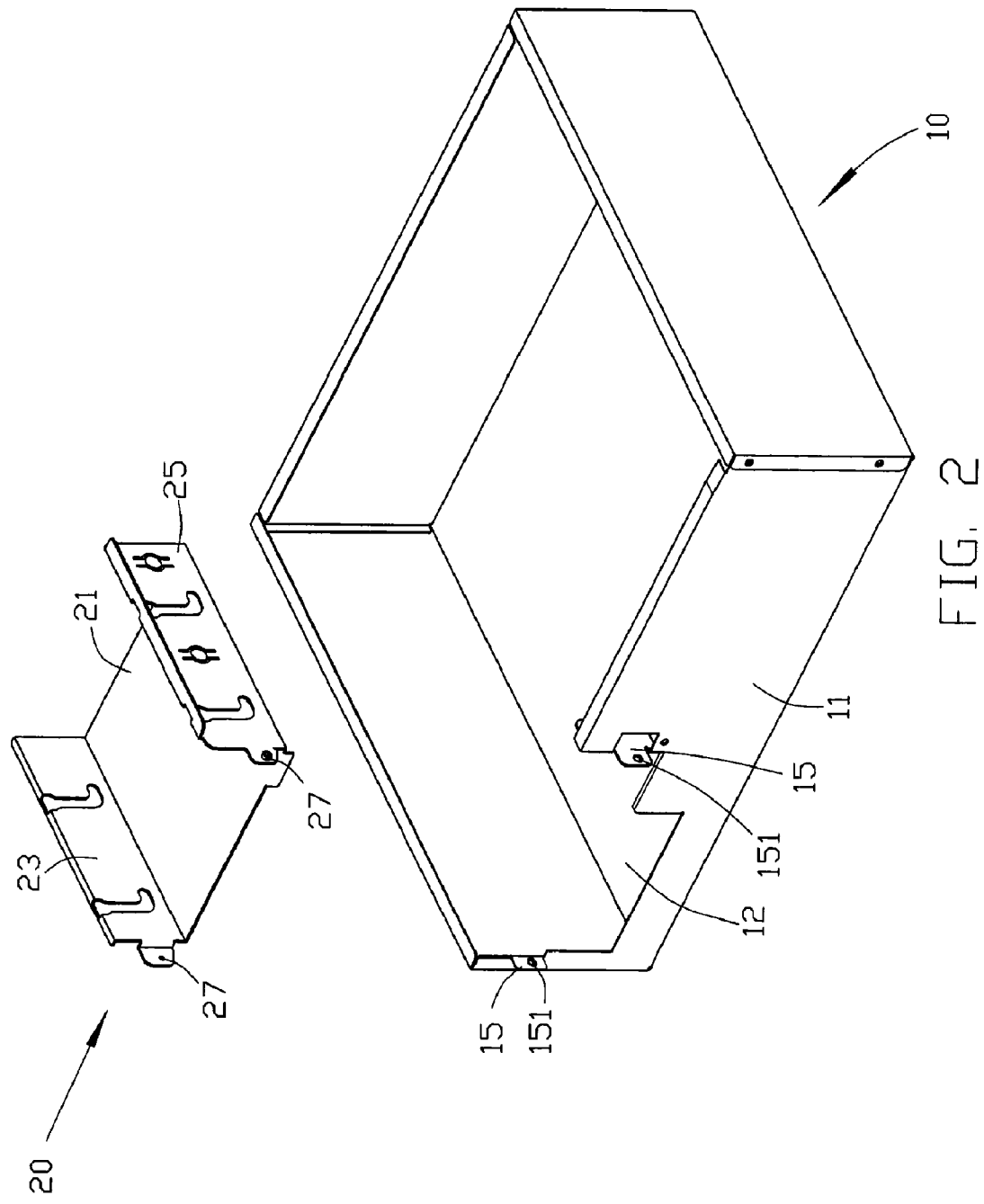
FIG. 2 is an isometric view of the chassis and the drive bracket of FIG. 1.

Referring to FIGS. 1 and 2, the chassis 10 includes a front panel 11 with an opening 12 defined therein. A supporting piece 15 is formed from each of the opposite edges of the opening 12 respectively. Each supporting piece 15 defines a pivot hole 151. A pair of screw holes 17 is defined in a bottom panel 13 of the chassis 10 for securing the holder 40 in the chassis 10 (only one screw hole 17 can be seen in FIG. 1).

Figure 3:
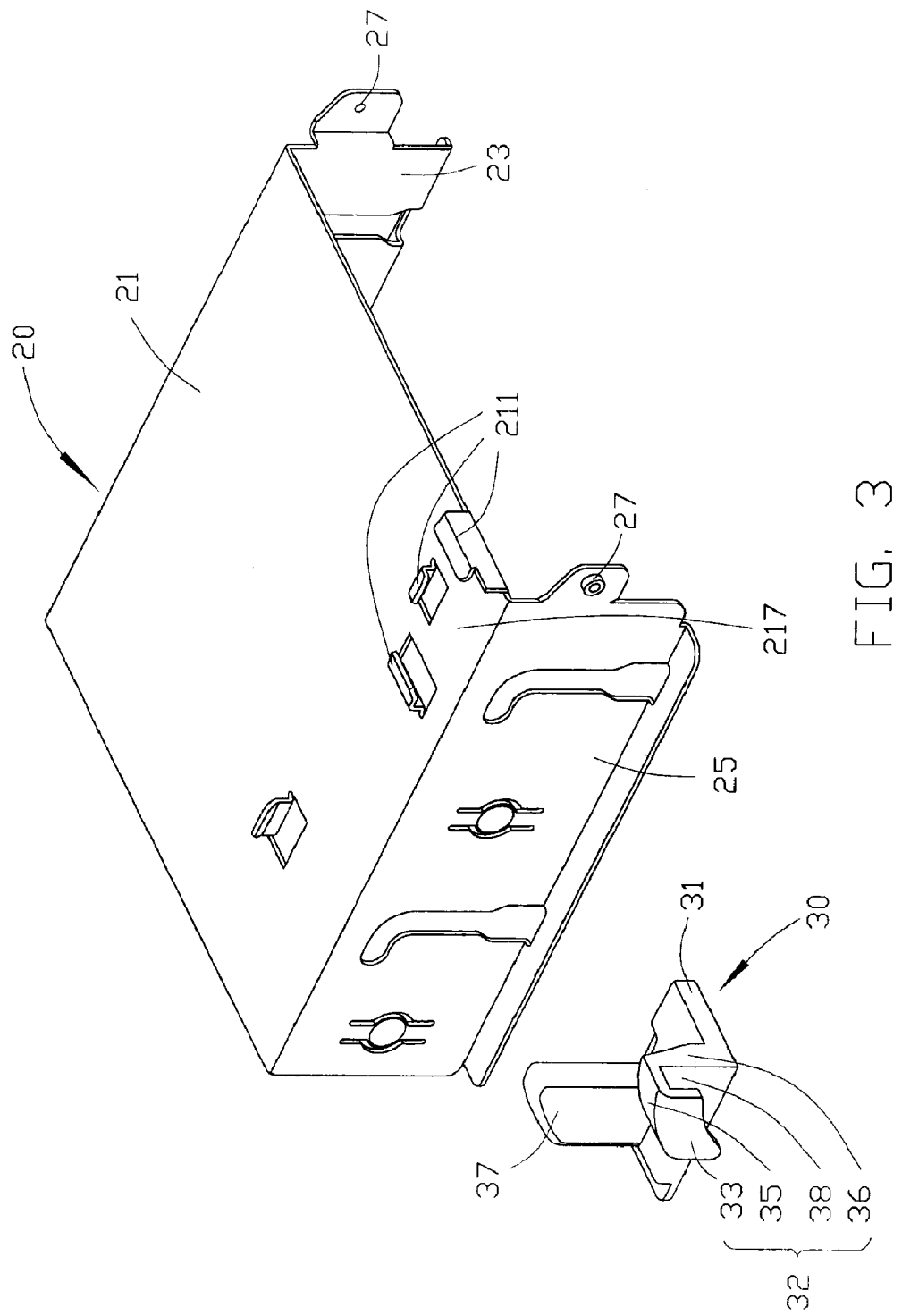
FIG. 3 is an enlarged, isometric view of the drive bracket and the positioning member of FIG. 1.

Referring to FIGS. 1 and 3, the drive bracket 20 includes a bottom plate 21, and two side plates 23, 25 extending perpendicularly from opposite edges of the bottom plate 21. A pivot 27 is formed on a front portion of each of the side plates 23, 25 for pivoting in the pivot hole 151 of the chassis 10. Three clips 211 are formed on a bottom of the bottom plate 21 near an edge thereof. The three clips 211 together define a receiving space 217 therebetween.

The positioning member 30 includes a base 31, and an "n"-shaped bent piece 32 extending from the base 31. The "n"-shaped bent piece 32 includes an upright portion 36, a first positioning piece 33 being parallel with the upright portion 36, and an arcuate connecting portion 35 connecting the upright portion 36 and the first positioning piece 33. The upright portion 36, the connecting portion 35, and the first positioning piece 33 define an arcuate groove 38 therebetween. A second positioning piece 37 is formed from the base 31 adjacent the bent piece 32.

The holder 40 includes a first clamp 45 and a second clamp 46. The first clamp 45 includes a first wall 41, a second wall 42 parallel to the first wall 41, and a first groove 451 defined between the first wall 41 and the second wall 42. A width of the first groove 451 is slightly less than a width of the first positioning piece 33 of the positioning member 30. The second wall 42 comprises an arcuate peripheral edge, corresponding to the arcuate groove 38 of the positioning member 30. A thickness of the second wall 42 is greater than a width of the arcuate groove 38.

The second clamp 46 includes a third wall 43, a fourth wall 44 parallel to the third wall 43, and a second groove 461 defined between the third wall 43 and the fourth wall 44. A width of the second groove 461 is slightly less than a width of the second positioning piece 37 of the positioning member 30. The first clamp 45 is higher than the second clamp 46. Two screw holes 48 are defined at a bottom of the holder 40.

The base 31 of the positioning member 30 is inserted into the receiving space 217 of the bottom plate 21 of the drive bracket 20. The clips 211 clasp edges of the base 31 to secure the positioning member 30 at the bottom of the bottom plate 21. The positioning member 30 is secured on the bottom plate 21, the bent piece 32 protruding outward from the side plates 25 of the drive bracket 20.

Figure 4:
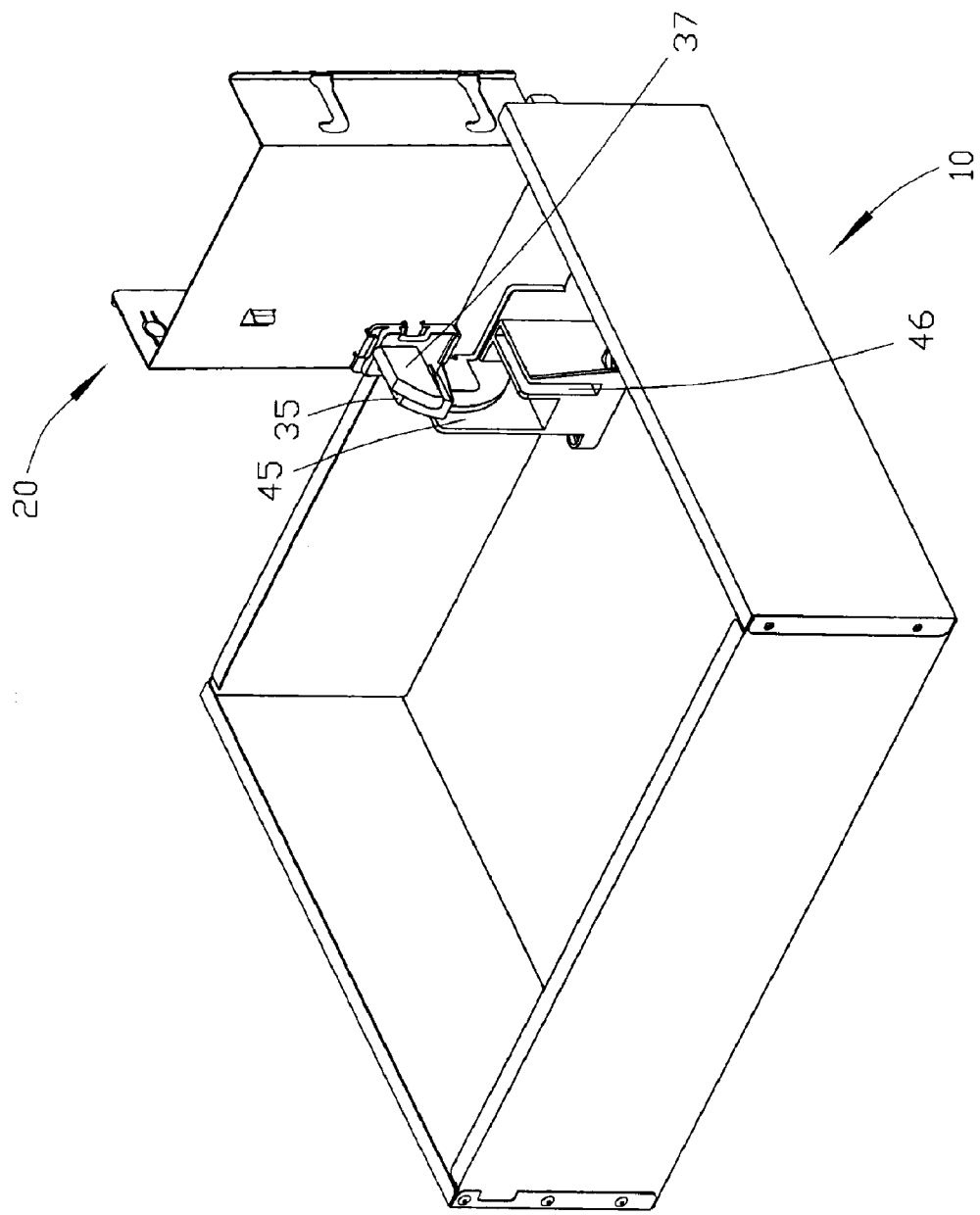
FIG. 4 is an assembled view of FIG. 1, showing the drive bracket rotated to a fully upright position.

Referring to FIGS. 1 and 4, two screws 80 are screwed into the screw holes 48 and screw holes 17 to secure the holder 40 in the chassis 10. Then, the drive bracket 21 is placed vertically, and the pivots 27 of the drive bracket 21 are inserted into the pivot holes 151 of the chassis 10, so that the drive bracket 21 is pivotable in the chassis 10. The first clamp 45 of the holder 40 is aligned to receive the first positioning piece 33 of the bent piece 32 of the positioning member 30 when the drive bracket 21 is pivoted down.

Because the first clamp 45 is higher, the first positioning piece 33 is intruded into the first groove 451 of first clamp 45 when the drive bracket 20 is rotated down. The first wall 41 and the second wall 42 are deformed flexibly to clamp the first positioning piece 33 in the first groove 451, so the drive bracket 20 can be positioned in an inclined position due to the clamping force on the first positioning piece 33. At the same time, the second wall 42 is also intruded into the arcuate groove 38 to be clamped for further positioning the drive bracket 20. The groove 38 and the second wall 42 are arcuate, so when the drive bracket 20 rotates, the second wall 42 and the connecting portion 35 of the bent piece 32 don't interfere with each other.

Referring to FIG. 5, while the drive bracket 20 rotates, the second positioning piece 37 is intruding into the second groove 461 of the second clamp 46 whereby the clamping action allows the drive bracket 20 to rest in any of many possible incline positions.

Although the first wall 41 and the second wall 42 are longer, they are out of the path of the drive bracket 20, so when the drive bracket 20 rotates to a horizontal position, the first wall 41 and the second wall 42 don't interfere with the drive bracket 20.

In alternative embodiments, the positioning pieces 33, 35 and the clamps 45, 46 can be formed on the drive bracket 20 and chassis 10 directly, or the positioning pieces 33, 35 are set on the chassis 10, and the clamps 45, 46 are set on the drive bracket 20.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure comprising:
   a chassis;
   a drive bracket pivotably attached to the chassis around a pivot axis which extends in a first direction;
   a positioning member attached to the drive bracket, the positioning member comprising a first positioning piece, the first positioning piece extending in a second direction perpendicular to the first direction, the first positioning piece formed on an "n"-shaped bent piece, the "n"-shaped bent piece comprising an upright portion which is parallel to the first positioning piece, an arcuate connecting portion connecting the upright portion and the first positioning piece, the upright portion, the connecting portion and the first positioning piece together defining an arcuate groove thereamong;
   a holder mounted in the chassis, the holder comprising a first clamp with a first groove defined therein, a width of the first groove being less than a width of the first positioning piece, the first clamp comprising a first wall and a second wall parallel to the first wall, both of the first wall and the second wall extending in a third direction perpendicular to the first direction, the first groove being defined between the first wall and the second wall, the second wall comprising an arcuate peripheral edge configured to insert in the arcuate groove;
   wherein when the drive bracket is pivoted in the chassis around the pivot axis, the first positioning piece is interferentially intruded in the first groove and the arcuate peripheral edge of the second wall is interferentially intruded in the arcuate groove to adjustably position the drive bracket.

2. The computer enclosure as described in claim 1, wherein a width of the second wall is greater than a width of the arcuate groove.

3. The computer enclosure as described in claim 2, wherein the bent piece and the second wall are aligned outside the range of motion of a side plate of the drive bracket.

4. The computer enclosure as described in claim 1, wherein the positioning member comprises a second positioning piece, and the holder comprises a second clamp for clamping the second positioning piece therein.

5. The computer enclosure as described in claim 4, wherein the second clamp comprises a third wall, a fourth wall parallel to the third wall, and a second groove defined between the third wall and the fourth wall, a width of the second groove is less than a width of the second positioning piece.

6. The computer enclosure as described in claim 1, wherein the positioning member comprises a base, and a plurality of clips is formed on the drive bracket to clasp the base of the positioning member for securing the positioning member to the drive bracket.

* * * * *